(12) United States Patent
Kishii (10) Patent No.: US 8,287,433 B2
(45) Date of Patent: Oct. 16, 2012

(54) WORK VEHICLE

(75) Inventor: Kenichi Kishii, Komatsu (JP)

(73) Assignee: Komatsu Ltd., Tokyo (JP)

( * ) Notice: Subject to any disclaimer, the term of this patent is extended or adjusted under 35 U.S.C. 154(b) by 483 days.

(21) Appl. No.: 12/335,667

(22) Filed: Dec. 16, 2008

(65) Prior Publication Data

US 2009/0182475 A1 Jul. 16, 2009

(30) Foreign Application Priority Data

Jan. 10, 2008 (JP) .................................. 2008-003635
Oct. 6, 2008 (JP) .................................. 2008-259669

(51) Int. Cl.
*B60W 10/02* (2006.01)
(52) U.S. Cl. .............................. 477/181; 477/76; 701/68
(58) Field of Classification Search ................. 701/5, 50, 701/54, 67, 68; 477/76, 181, 210
See application file for complete search history.

(56) References Cited

U.S. PATENT DOCUMENTS

| | | | | |
|---|---|---|---|---|
| 4,316,355 A | * | 2/1982 | Hoff ................................ | 56/11.3 |
| 4,651,142 A | * | 3/1987 | Klatt ............................. | 340/453 |
| 5,613,581 A | * | 3/1997 | Fonkalsrud et al. .......... | 192/3.23 |
| 5,980,428 A | * | 11/1999 | Liu ................................ | 477/180 |
| 6,162,146 A | * | 12/2000 | Hoefling ........................ | 477/73 |
| 6,371,885 B1 | | 4/2002 | Kobayashi et al. | |
| 6,595,898 B2 | * | 7/2003 | Kobayashi et al. ........... | 477/174 |
| 6,647,332 B1 | * | 11/2003 | Esterby et al. ................ | 701/51 |
| 6,929,580 B2 | * | 8/2005 | Frotscher ....................... | 477/76 |
| 6,943,676 B2 | * | 9/2005 | Mack ............................. | 340/453 |
| 7,165,662 B2 | * | 1/2007 | Kuhner et al. ................ | 192/13 R |
| 7,437,965 B2 | * | 10/2008 | Shizume ........................ | 74/333 |
| 2002/0058567 A1 | * | 5/2002 | Rogg ............................. | 477/71 |
| 2004/0061603 A1 | * | 4/2004 | Mack ............................. | 340/453 |
| 2005/0177294 A1 | * | 8/2005 | Jiang et al. .................... | 701/67 |
| 2006/0293146 A1 | * | 12/2006 | Nakayashiki et al. ......... | 477/76 |
| 2007/0039770 A1 | * | 2/2007 | Barrette et al. ............... | 180/197 |
| 2007/0113694 A1 | * | 5/2007 | Shizume ........................ | 74/335 |
| 2008/0215220 A1 | * | 9/2008 | Winkel et al. .................. | 701/68 |
| 2008/0254939 A1 | * | 10/2008 | Ichimura ....................... | 477/107 |
| 2009/0318265 A1 | * | 12/2009 | Ginther ......................... | 477/181 |
| 2011/0118083 A1 | * | 5/2011 | Nishimaki et al. ............ | 477/169 |

FOREIGN PATENT DOCUMENTS

| | | | |
|---|---|---|---|
| JP | 08158410 A | * | 6/1996 |
| JP | 10-196583 A | | 7/1998 |
| JP | 10-281179 A | | 10/1998 |
| JP | 2000-337489 A | | 12/2000 |
| JP | 2006-1338 A | | 1/2006 |
| WO | WO 2006035589 A1 | * | 4/2006 |
| WO | WO 2006131268 A1 | * | 12/2006 |
| WO | WO 2007130446 A2 | * | 11/2007 |

* cited by examiner

*Primary Examiner* — Jeremy R Severson
*Assistant Examiner* — Howard Sanders
(74) *Attorney, Agent, or Firm* — Global IP Counselors (57) ABSTRACT

A work vehicle includes an engine, a travel mechanism, a clutch, an inching operation member, and a controller. The travel mechanism is configured to cause the vehicle to travel. The clutch is configured to selectively transmit drive force from the engine to the travel mechanism. The inching operation member is configured to be operated to create slippage in the clutch to reduce vehicle speed. The controller is configured to calculate load of the clutch during inching, and to reduce a rotational speed of the engine when the calculated load of the clutch during the inching exceeds a predetermined threshold.

7 Claims, 6 Drawing Sheets

WORK VEHICLE

CROSS-REFERENCE TO RELATED APPLICATIONS

This application claims priority to Japanese Patent Application Nos. 2008-003635, filed on Jan. 10, 2008 and 2008-259669, filed on Oct. 6, 2008. The entire disclosures of Japanese Patent Application Nos. 2008-003635 and 2008-259669 are hereby incorporated herein by reference.

BACKGROUND OF THE INVENTION

1. Field of the Invention

The present invention relates to a work vehicle, and particularly to a work vehicle having an inching function for creating slippage in a clutch and reducing vehicle speed.

2. Background Information

Japanese Laid-Open Patent Application Publication No. 2000-337489 discloses a conventional work vehicle that has an inching function for creating slippage in a clutch and reducing vehicle speed. When this inching function is used, it is possible to reduce the vehicle speed while maintaining rotational speed of an engine at or above a rotational speed of a certain extent. For example, there are cases with motor graders in which the vehicle travels while performing ground leveling work with a blade. In this case, an operator can adjust the vehicle speed while suppressing reduction in drive force of the blade by operating an inching operation member to create slippage in a clutch.

SUMMARY OF THE INVENTION

However, in the work vehicle described above, when the inching operation continues for a long period of time, the amount of heat generated in the clutch increases, and the wear on the clutch increases as well. During the inching operation, most of engine output is diffused as heat without being transmitted to a travel apparatus, and therefore some of the engine output is wasted and fuel consumption is reduced.

An object of the present invention is to provide a work vehicle in which the wear on the clutch due to inching can be suppressed, and fuel consumption can be improved.

A work vehicle according to a first aspect of the present invention includes an engine, a travel mechanism, a clutch, an inching operation member, and a controller. The travel mechanism configured to cause the vehicle to travel. The clutch is configured to selectively transmit drive force from the engine to the travel mechanism. The inching operation member is configured to be operated to create slippage in the clutch and to reduce a vehicle speed. The controller is configured to calculate load of the clutch during inching, and to reduce rotational speed of the engine when the calculated load of the clutch during the inching exceeds a predetermined threshold.

In this work vehicle, an operator creates slippage in the clutch by operating the inching member, whereby the vehicle speed can be adjusted. In cases in which the controller calculates the load of the clutch and the load exceeds the predetermined threshold, the rotational speed of the engine is reduced, and it is therefore possible to suppress excessive slippage of the clutch during inching such as is described above. Wear on the clutch can thereby be suppressed and the clutch can be preserved. Fuel consumption can also be improved because unnecessary slippage of the clutch can be suppressed.

The work vehicle according to a second aspect of the present invention is the work vehicle of the first aspect of the present invention, wherein the controller is configured to calculate the load of the clutch on the basis of a surface pressure of the clutch and a rate of slippage of the clutch.

In this work vehicle, the load of the clutch can be easily calculated from the surface pressure of the clutch and the rate of slippage of the clutch.

The work vehicle according to a third aspect of the present invention includes an engine, a travel mechanism, a clutch, an inching operation member, and a controller. The travel mechanism is configured to cause the vehicle to travel. The clutch is configured to selectively transmit drive force from the engine to the travel mechanism. The inching operation member is configured to be operated to create slippage in the clutch to reduce a vehicle speed. The controller is configured to calculate temperature of the clutch during inching to reduce rotational speed of the engine when the calculated temperature of the clutch during the inching exceeds a predetermined threshold.

In this work vehicle, an operator creates slippage in the clutch by operating the inching member, whereby the vehicle speed can be adjusted. In cases in which the controller calculates the temperature of the clutch and the calculated temperature of the clutch exceeds the predetermined value, the rotational speed of the engine is reduced, and it is therefore possible to suppress excessive slippage of the clutch during inching such as is described above. Wear on the clutch can thereby be suppressed and the clutch can be preserved. Fuel consumption can also be improved because unnecessary slippage of the clutch can be suppressed.

In the work vehicle according to the present invention, excessive slippage of the clutch during inching can be suppressed. Wear on the clutch can thereby be suppressed and the clutch can be preserved. Since unnecessary slippage of the clutch can be suppressed, fuel consumption can be improved.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Configuration of Work Vehicle

Figure 1:
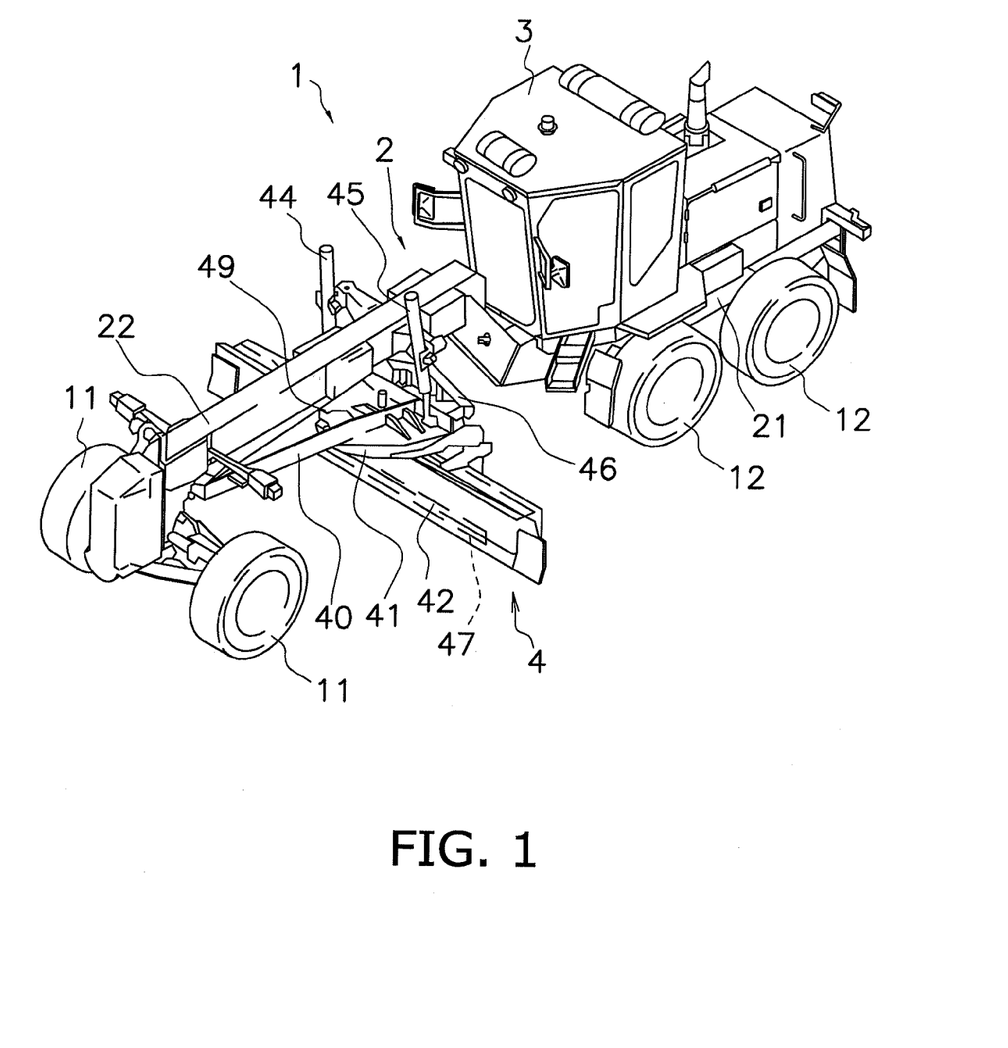
FIG. 1 is an overall perspective view of a work vehicle.
Figure 2:
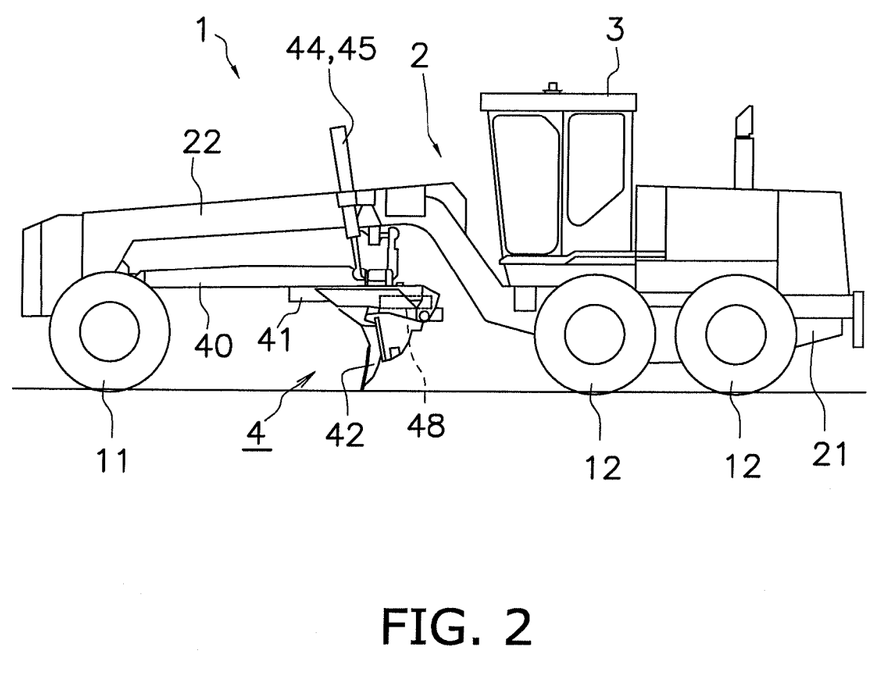
FIG. 2 is a side elevational view of a work vehicle.

An overall perspective view and a side elevational view of a work vehicle 1 according to an embodiment of the present invention are shown in FIGS. 1 and 2. In this embodiment, the work vehicle I is a motor grader and comprises six traveling wheels, including a pair of left and right front wheels 11, and two rear wheels 12 on each side. The work vehicle 1 can perform ground leveling work, snow removal work, light cutting, material mixing, and other work with a blade 42 provided between the front wheels 11 and the rear wheels 12. Of the four rear wheels 12, only those positioned on the left side are shown in FIGS. 1 and 2.

As shown in FIGS. 1 and 2, the work vehicle 1 comprises a frame 2, an operator cab 3, and a work implement 4. The work vehicle 1 also comprises an engine 5, a power transmission mechanism 6, a travel mechanism 9, a hydraulic drive mechanism 7, an operation unit 10, a controller 8, and other components, as shown in FIG. 3.

Frame 2 and Operator Cab 3

The frame 2 includes a rear frame 21 and a front frame 22, as shown in FIGS. 1 and 2.

Figure 3:
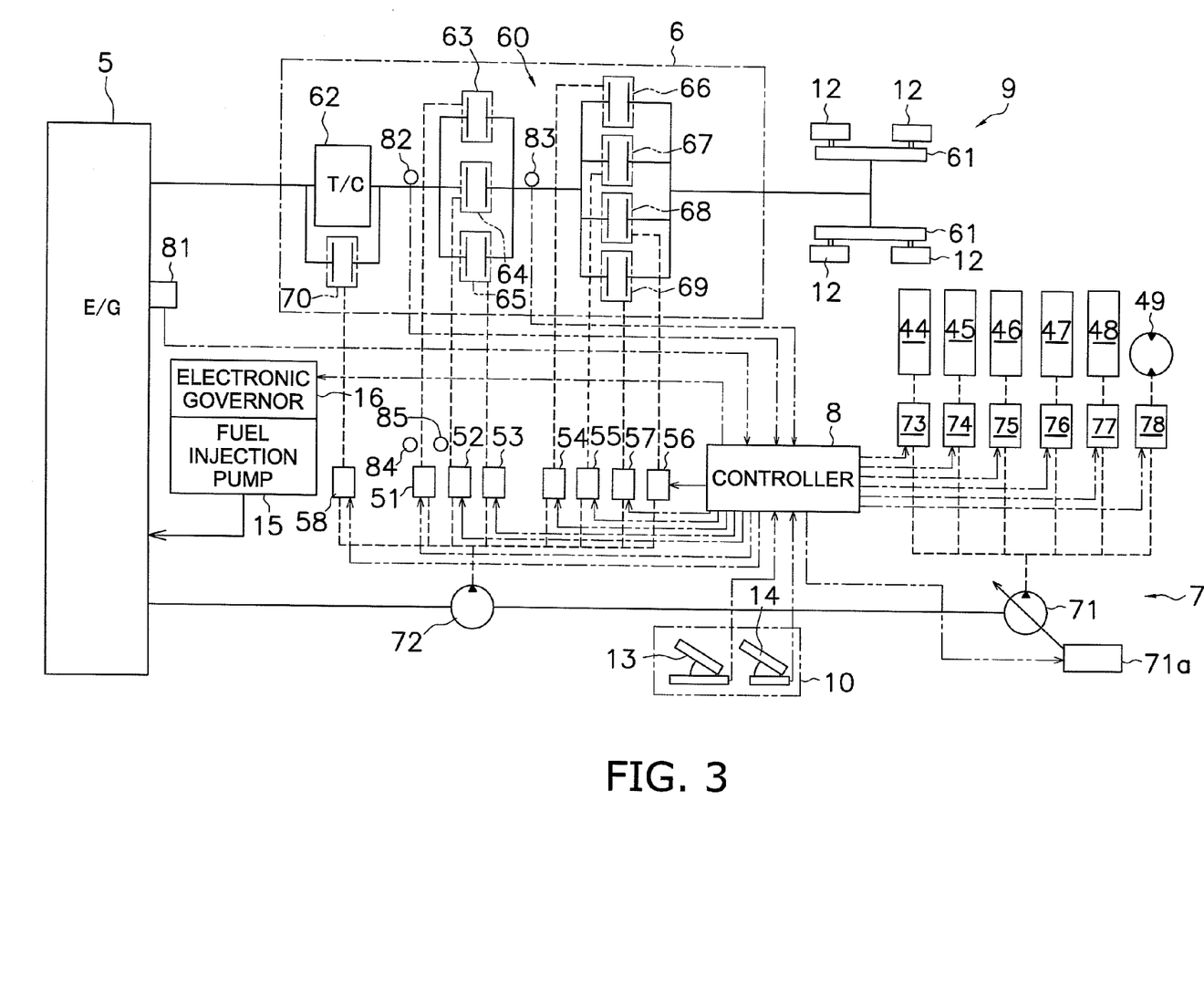
FIG. 3 is a block diagram showing the configuration of the work vehicle.

The rear frame 21 houses the engine 5, the power transmission mechanism 6, the hydraulic drive mechanism 7, and other components shown in FIG. 3. The aforementioned four rear wheels 12 are also provided to the rear frame 21, and the rear wheels 12 are rotatably driven by the drive force from the engine 5, whereby the vehicle travels.

The front frame 22 is mounted in front of the rear frame 21, and the aforementioned front wheels 11 are mounted on the front end of the front frame 22.

The operator cab 3 is installed on the rear frame 21, and inside the operator cab 3 are provided with a steering wheel, a gearshift lever, an operation lever for the work implement 4, a brake operator, an acceleration pedal 14, an inching pedal 13, and other operation units (see FIG. 3). The operator cab 3 may be also installed on the front frame 22.

Work Implement 4

The work implement 4 has a drawbar 40, a circle 41, a blade 42, a hydraulic motor 49, various hydraulic cylinders 44 through 48, and other components.

The front end of the drawbar 40 is swingably mounted to the front end of the front frame 22, and the rear end of the drawbar 40 rises and falls vertically due to the synchronized expansion and contraction of a pair of lift cylinders 44, 45. The drawbar 40 is vertically tilted by the differing expansion and contraction of the lift cylinders 44, 45. Furthermore, the drawbar 40 swings up and down around an axis running in the vehicle's forward direction due to the expansion and contraction of a drawbar shift cylinder 46.

The circle 41 is rotatably mounted on the rear end of the drawbar 40. The circle 41 is driven by the hydraulic motor 49 (see FIG. 1) to rotate clockwise or counterclockwise in relation to the drawbar 40, as seen from above the vehicle.

The blade 42 is supported so as to be capable of sliding in the transverse direction in relation to the circle 41, and to be capable of swinging vertically around an axis parallel to the transverse direction. The term "transverse direction" herein refers to the left and right directions in relation to the vehicle's forward direction. The blade 42 can be moved in the transverse direction in relation to the circle 41 by a blade shift cylinder 47 supported on the circle 41. The blade 42 can also be swung in relation to the circle 41 around an axis parallel to the transverse direction, and be varied in terms of its vertical orientation, by a tilt cylinder 48 (see FIG. 2) supported on the circle 41. As described above, the blade 42 is capable of vertically rising and falling in relation to the vehicle, varying its incline in relation to the forward direction, varying its incline in relation to the transverse direction, rotating, and shifting to the left and right, via the drawbar 40 and the circle 41.

The hydraulic motor 49 is driven by pressure oil supplied from a first hydraulic pump 71 described hereinafter, whereby the circle 41 can be rotated.

The various hydraulic cylinders 44 through 48 are cylinders driven by hydraulic pressure supplied from the first hydraulic pump 71, and these cylinders include the pair of lift cylinders 44, 45, the drawbar shift cylinder 46, the blade shift cylinder 47, the tilt cylinder 48, or the like, as described above. The pair of lift cylinders 44, 45 are provided separated from each other to the left and right, with the front frame 22 in between. The lift cylinders 44, 45 are disposed mostly along the vertical direction, and are mounted to the front frame 22 and the drawbar 40. The lift cylinders 44, 45 move the rear end of the drawbar 40 up and down by expanding and contracting, whereby the blade 42 can be moved up and down. The drawbar shift cylinder 46 is disposed at an incline in relation to the vertical direction, and is mounted at the side end of the front frame 22 and the drawbar 40. The drawbar shift cylinder 46 can vary the angle of inclination of the drawbar 40 in relation to the transverse direction by expanding and contracting, whereby the angle of inclination of the blade 42 can be varied. The blade shift cylinder 47 is disposed along the longitudinal direction of the blade 42 and is mounted to the circle 41 and the blade 42. The blade shift cylinder 47 can vary the position of the blade 42 in the longitudinal direction by expanding and contracting. The tilt cylinder 48 is mounted to the circle 41 and the blade 42 and is capable of swinging the blade 42 up and down around an axis running in the transverse direction by expanding and contracting, whereby the angle of inclination of the blade 42 in relation to the forward direction can be varied.

Engine 5

A fuel injection pump 15 is attached to the engine 5 as shown in FIG. 3, and fuel is supplied to the engine 5 from the fuel injection pump 15. The amount of fuel supplied to the engine 5 is controlled by a command signal outputted to an electronic governor 16 from the controller 8 described hereinafter. The rotational speed of the engine 5 is detected by an engine rotational speed sensor 81 and is sent as a detection signal to the controller 8. The controller 8 is configured to control the amount of fuel supplied to the engine 5 and control the rotational speed of the engine 5 by sending the command signal to the electronic governor 16.

Power Transmission Mechanism 6

The power transmission mechanism 6 is a mechanism for transmitting drive force from the engine 5 to the rear wheels 12, and the mechanism has a torque converter 62 and a transmission 60.

The torque converter 62 is connected to the output side of the engine 5. The torque converter 62 is provided with a lockup clutch 70 for directly coupling the output shaft and the input shaft of the torque converter 62. The lockup clutch 70 is a hydraulic clutch driven by the hydraulic pressure supplied from a second hydraulic pump 72 described hereinafter. The lockup clutch 70 is changed between an engaged state and a released state by the operation of a changeover switch included in the aforementioned operation unit 10. When the changeover switch is operated by the operator to induce lockup, the controller 8 sends a command signal to a lockup clutch control valve 58, hydraulic pressure is supplied to the lockup clutch 70, and the lockup clutch 70 goes into the engaged state. When the lockup clutch 70 goes into the engaged state, the drive force from the engine 5 is transmitted without the aid of the torque converter 62. When the lockup clutch 70 goes into the released state, the drive force from the engine 5 is transmitted via the torque converter 62.

The transmission 60 has various clutches 63 through 69, a plurality of shifting gears (not shown), and other components.

The various clutches 63 through 69 are hydraulic clutches driven by oil pressure supplied from the second hydraulic pump 72 described hereinafter, and these clutches include an FL clutch 63, an FH clutch 64, an R clutch 65, a first clutch 66, a second clutch 67, a third clutch 68, and a fourth clutch 69. The FL clutch 63 and the FH clutch 64 go into the engaged state when the vehicle moves forward. The R clutch 65 goes into the engaged state when the vehicle moves backward. The first clutch 66, the second clutch 67, the third clutch 68, and the fourth clutch 69 go into the engaged state when drive force is transmitted to the respective corresponding shifting gears. In the transmission 60, during forward movement, it is possible to select from a first through eighth speed through a combination of either the FL clutch 63 and FH clutch 64, and any of the first through fourth clutches 66 through 69. During reverse movement, it is possible to select from a first through fourth speed through a combination of the R clutch 65 and any of the first through fourth clutches 66 through 69.

The rotational speed inputted to the FL clutch 63 and the FH clutch 64 is detected by an input rotational speed sensor 82, and is sent as a detection signal to the controller 8. The rotational speed outputted from the FL clutch 63 and the FH clutch 64 is detected by an output rotational speed sensor 83, and is sent as a detection signal to the controller 8.

Travel Mechanism 9

The travel mechanism 9 is a mechanism for causing the vehicle to travel using the drive force from the engine 5. The drive force from the engine 5 is transmitted to the travel mechanism 9 via the power transmission mechanism 6. The travel mechanism 9 has a final reducer (not shown), a tandem device 61, and the rear wheels 12. The drive force outputted from the transmission 60 is transmitted to the rear wheels 12 via the final reducer and the tandem device 61, and the rear wheels 12 are rotatably driven, whereby the vehicle travels.

Hydraulic Drive Mechanism 7

The hydraulic drive mechanism 7 is a mechanism for creating hydraulic pressure by means of the drive force from the engine 5 and driving the aforementioned various clutches 63 through 69, the hydraulic motor 49, and the various cylinders 44 through 48 by means of the hydraulic pressure. The hydraulic drive mechanism 7 has the first hydraulic pump 71, the second hydraulic pump 72, and various hydraulic control valves 73 through 78 and 51 through 57.

The first hydraulic pump 71, being driven by the drive force from the engine 5, creates hydraulic pressure supplied to the various cylinders 44 through 48 and the hydraulic motor 49. The first hydraulic pump 71 is a variable displacement pump capable of varying the displacement of discharged pressure oil by varying the tilt angle of a swashplate by means of a pump displacement control cylinder 71a.

The second hydraulic pump 72, being driven by the drive force form the engine 5, creates hydraulic pressure supplied to the various clutches 63 through 69.

The various hydraulic control valves 73 through 78 and 51 through 57 are electromagnetic proportional control valves capable of adjusting hydraulic pressure by being electrically controlled by the controller 8, and these valves include first through fifth cylinder control valves 73 through 77, a hydraulic motor control valve 78, first through seventh clutch control valves 51 through 57, or the like.

The first through fifth cylinder control valves 73 through 77 adjust the hydraulic pressure supplied to the aforementioned various cylinders 44 through 48. The hydraulic pressure supplied to the various cylinders 44 through 48 is detected by a hydraulic pressure sensor (not shown) and is sent as a detection signal to the controller 8.

The hydraulic motor control valve 78 adjusts the hydraulic pressure supplied to the aforementioned hydraulic motor 49.

The first through seventh clutch control valves 51 through 57 adjust the hydraulic pressure supplied to the aforementioned various clutches 63 through 69. Specifically, the first clutch control valve 51 adjusts the hydraulic pressure supplied to the FL clutch 63. The second clutch control valve 52 adjusts the hydraulic pressure supplied to the FH clutch 64. The third clutch control valve 53 adjusts the hydraulic pressure supplied to the R clutch 65. The fourth clutch control valve 54 adjusts the hydraulic pressure supplied to the first clutch 66. The fifth clutch control valve 55 adjusts the hydraulic pressure supplied to the second clutch 67. The sixth clutch control valve 56 adjusts the hydraulic pressure supplied to the third clutch 68. The seventh clutch control valve 57 adjusts the hydraulic pressure supplied to the fourth clutch 69.

The hydraulic pressure supplied to the various clutches 63 through 69 is detected by a hydraulic pressure sensor and is sent as a detection signal to the controller 8. In FIG. 3, only a hydraulic pressure sensor 84 for detecting hydraulic pressure supplied to the FL clutch 63 and a hydraulic pressure sensor 85 for detecting hydraulic pressure supplied to the FH clutch 64 are shown, and the other hydraulic pressure sensors are omitted.

Operation Unit 10

The operation unit 10 is a part operated by the operator in order to control the traveling of the work vehicle 1 or to control the work implement 4. The operation unit 10 has the acceleration pedal 14, the inching pedal 13, and other operation members. The acceleration pedal 14 is an operation member for setting the engine rotational speed to a desired rotational speed. The inching pedal 13 is an operation member which is operated in order to create slippage in the FL clutch 63 or the FH clutch 64 and to reduce the vehicle speed. When the operation members of the operation unit 10 are operated, an operation signal corresponding to the amount of operation thereof is sent to the controller 8.

Controller 8

The controller 8 is configured to control the work implement 4 by controlling the first through fifth cylinder control valves 73 through 77 and the hydraulic motor control valve 78 on the basis of the operation signals from the operation unit 10, the detection signals from the various sensors, or the like. For example, the controller 8 is configured to move the blade 42 up and down by sending a command signal to the first cylinder control valve 73 and the second cylinder control valve 74 to control the hydraulic pressure supplied to the lift cylinders 44, 45.

The controller 8 is configured to perform speed-change control suited to the state of the vehicle by controlling the first through seventh clutch control valves 51 through 57 on the basis of the operation signals from the operation unit 1 0, the detection signals from the various sensors, or the like. For example, the controller 8 sends a command signal to the first clutch control valve 51 to supply hydraulic pressure to the FL clutch 63, and sends a command signal to the seventh clutch control valve 57 to supply hydraulic pressure to the fourth clutch 69. The FL clutch 63 and the fourth clutch 69 thereby go into the engaged state, and seventh gear speed is selected. The controller 8 sends a command signal to the second clutch control valve 52 to supply hydraulic pressure to the FH clutch 64, and sends a command signal to the fourth clutch control valve 54 to supply hydraulic pressure to the first clutch 66. The FH clutch 64 and the first clutch 66 thereby go into the engaged state, and second gear speed is selected.

The controller 8 determines the amount of fuel to be supplied to the engine 5 on the basis of an operation signal from the acceleration pedal 14 and the engine rotational speed detected by the engine rotational speed sensor 81. The controller 8 then sends a command signal corresponding to the determined supplied amount to the electronic governor. The amount of fuel injected form the fuel injection pump is thereby adjusted to an amount proportionate to the amount by which the acceleration pedal 14 is operated (hereinbelow referred to as the "acceleration operation amount"), and the engine rotational speed is controlled. The operator can thereby control the output of the work implement 4 and the speed of the vehicle.

Figure 4:
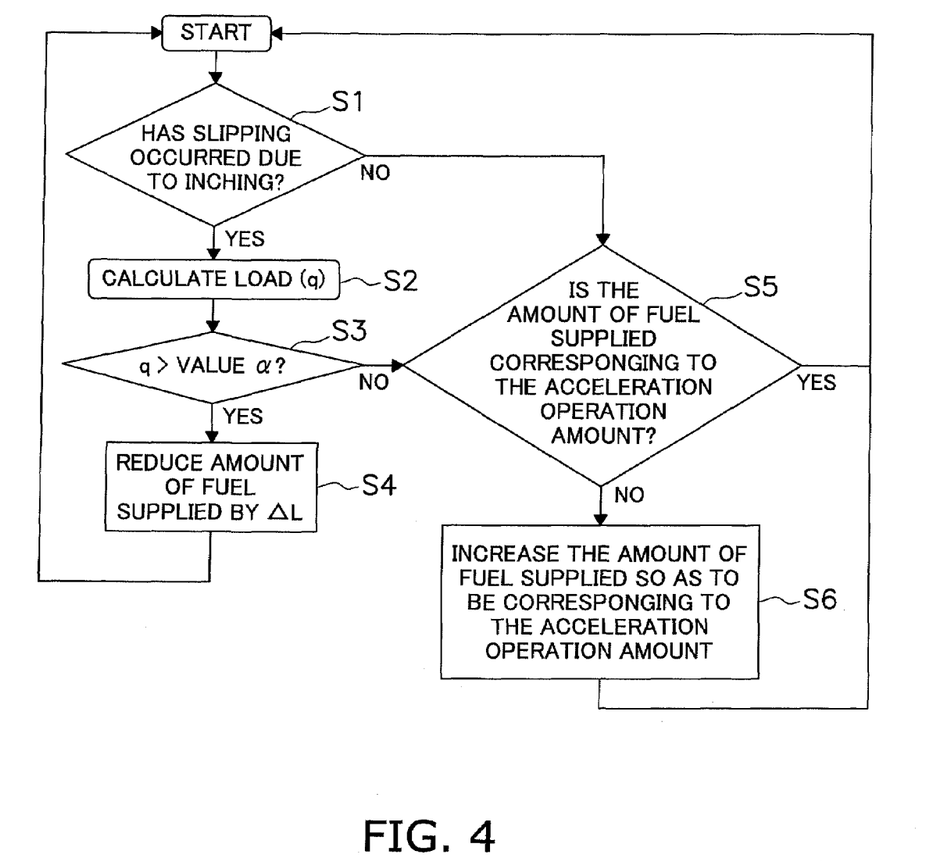
FIG. 4 is a flowchart of the clutch preservation control.

In cases in which the inching pedal 13 is being operated, the controller 8 reduces the hydraulic pressure supplied to the FL clutch 63 or the FH clutch 64 by adjusting the command signal to the first clutch control valve 51 or the second clutch control valve 52, on the basis of an operation signal from the inching pedal 13. Specifically, the surface pressure is reduced of whichever clutch between the FL clutch 63 and the FH clutch 64 is in the engaged state, thereby creating slippage. The drive force transmitted from the power transmission mechanism 6 to the travel mechanism 9 is thereby reduced, and the vehicle speed is reduced. Consequently, by operating the inching pedal 13, the operator can adjust the vehicle speed while suppressing the reduction in the engine rotational speed and maintaining the output of the work implement 4. Clutch preservation control shown in FIG. 4 is herein performed in order to prevent excessive clutch slippage in the work vehicle 1. The clutch preservation control is described hereinbelow based on the flow shown in FIG. 4.

First, in the first step S1, a determination is made as to whether or not inching has caused slippage to occur in the clutch. The determination as to whether or not slippage has occurred in the clutch is herein made from the operation signal from the inching pedal 13 and from the detection results of the input rotational speed sensor 82 and the output rotational speed sensor 83.

In cases in which inching has caused slippage to occur in the clutch in the first step S1, the process advances to the second step S2. In the second step S2, the load of the clutch (i.e., the clutch load (q)) is calculated. The clutch load is proportionate to the product of the surface pressure of the clutch in the engaged state and the rate of clutch slippage, and is therefore calculated from the clutch surface pressure and the clutch slippage rate. The clutch surface pressure can be calculated from the hydraulic pressure supplied to the FL clutch 63 or the FH clutch 64, from the surface area of the clutch disc, and other factors. More specifically, the clutch depression force can be calculated by multiplying the hydraulic pressure by the surface area of the piston portion operating the clutch, and the clutch surface pressure can be calculated by dividing the clutch depression force by the surface area of the contact part of the clutch disc. The hydraulic pressure supplied to the FL clutch 63 and the FH clutch 64 is found from the detection results of the aforementioned hydraulic pressure sensors 84, 85. The clutch slippage rate is the difference between the rotational speed inputted to the FL clutch 63 or the FH clutch 64 and the rotational speed outputted from the FL clutch 63 or the FH clutch 64, and the clutch slippage rate can be calculated from the detection results of the aforementioned input rotational speed sensor 82 and output rotational speed sensor 83.

In the third step S3, a determination is made as to whether or not the clutch load (q) exceeds a predetermined threshold ($\alpha$).

Figure 5:
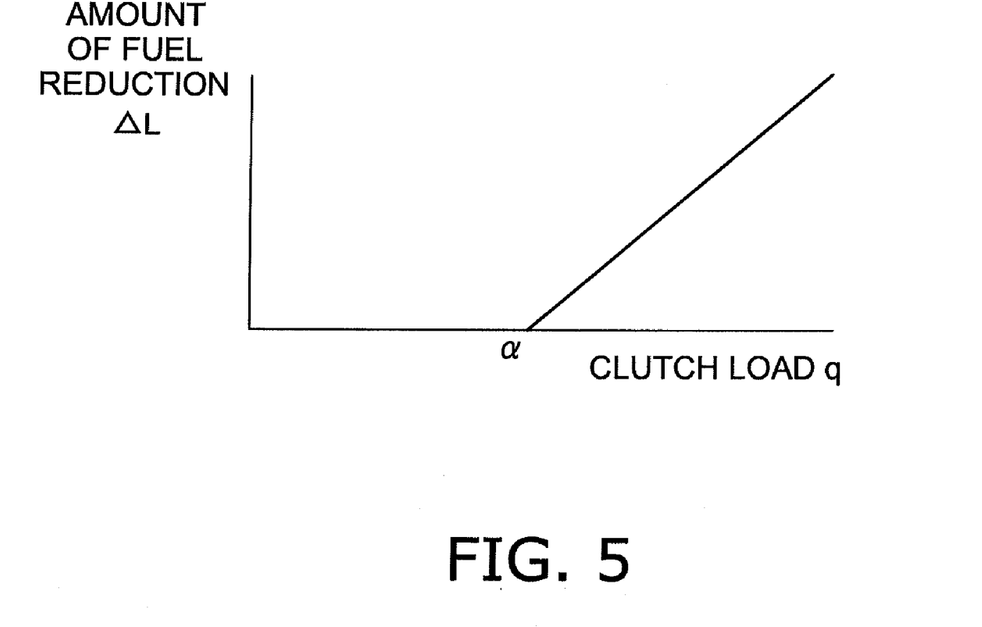
FIG. 5 is a graph showing the relationship between fuel reduction amount and load of the clutch.
Figure 6:
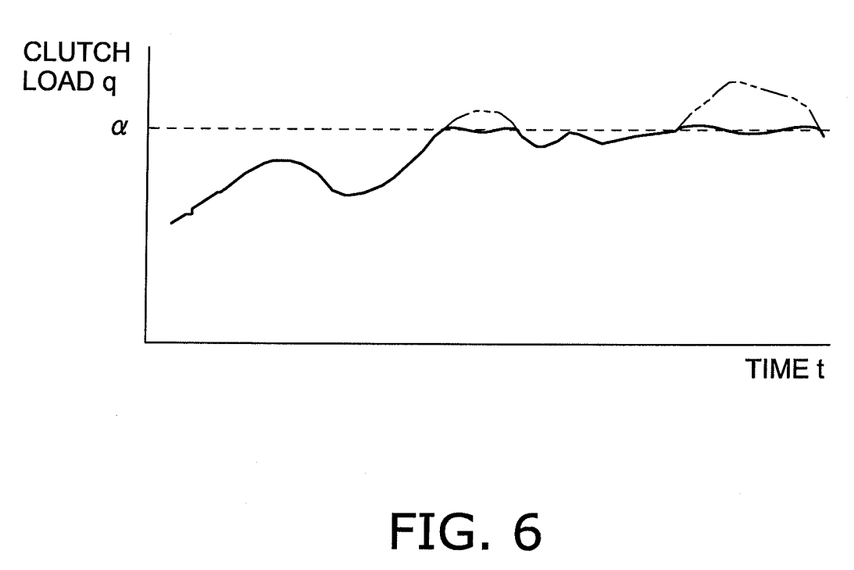
FIG. 6 is a graph showing the change in load of the clutch when clutch preservation control is performed.

In cases in which it is determined that the clutch load exceeds the predetermined threshold in the third step S3, the process advances to the fourth step S4. In the fourth step S4, the engine rotational speed is reduced by reducing the amount of fuel supplied to the engine 5. The reduced amount of supplied fuel (hereinbelow referred to simply as the "fuel reduction amount") changes so as to increase in accordance with increases in the clutch load, as shown in FIG. 5. The clutch load is thereby suppressed from increasing excessively, as shown in FIG. 6. In FIG. 6, the double-dashed line indicates changes in the clutch load when the clutch preservation control is not performed. The change in the fuel reduction amount shown in FIG. 5 is calculated in advance as a value necessary to preserve the clutch, and is stored as a graph or map in the controller 8.

In cases in which it is determined in the first step S1 that inching has not caused slippage to occur in the clutch, and in cases in which it is determined in the third step S3 that the clutch load has not exceeded the predetermined threshold, the process advances to the fifth step S5. In the fifth step S5, a determination is made as to whether or not the amount of fuel supplied is corresponding to the acceleration operation amount.

In cases in which it is determined in the fifth step S5 that the amount of fuel supplied is not corresponding to the acceleration operation amount, the process advances to the sixth step S6. In the sixth step S6, the amount of fuel supplied is increased to an amount corresponding to the acceleration operation amount. Therefore, in cases in which the clutch load is less than the threshold, the reduction in the amount of fuel supplied is ceased, and the amount of fuel supplied is set to an amount corresponding to the acceleration operation amount. The engine rotational speed reduced in order to preserve the clutch is thereby returned to the original rotational speed.

In cases in which it is determined in the fifth step S5 that the amount of fuel supplied is corresponding to the acceleration operation amount, the process returns to the first step S1.

In the work vehicle 1, clutch slippage is prevented from increasing excessively during inching. Increases in the clutch load can thereby be suppressed, and the clutch can be preserved.

In the work vehicle 1, since clutch slippage is prevented from increasing excessively, fuel consumption can be improved. Specifically, some of the engine output is wasted as heat due to clutch slippage, and in conventional work vehicles, the amount wasted as heat is large due to the engine output being excessive during inching. In view of this, in the work vehicle 1, the engine rotational speed is reduced in proportion to the needlessly wasted engine output, whereby fuel consumption can be improved without excessively reducing the vehicle speed.

Other Embodiments (a) In the embodiment described above, the controller 8 reduces the engine rotational speed in cases in which the clutch load exceeds a predetermined threshold, but the engine rotational speed may also be reduced in cases in which the temperature of the clutch exceeds a predetermined threshold. The temperature of the clutch can be calculated by the following mathematical formula (1), for example, because it is difficult to directly measure the temperature of the clutch.

Mathematical Formula (1)

$$T = T_0 + \frac{2.343 \times \mu \times P \times V}{am} \times \left(1 - e^{-\frac{am}{c \times \gamma \times V_0} \times t}\right) \quad (1)$$

In the mathematical formula (1), a value T indicates a temperature of the clutch, a value $T_0$ indicates an initial temperature of the clutch, a value $\mu$ indicates a coefficient of kinetic friction of the clutch disk, a value P indicates an apparent surface pressure of clutch disc, a value V indicates a circumferential velocity at mean diameter of clutch disc, a value $am$ indicates a mean heat transfer coefficient, a value c indicates a specific heat of clutch disc, a value $\gamma$ indicates a specific gravity of clutch disc, a value $V_0$ indicates a volume of clutch disc, and a value t indicates a time. The term "apparent surface pressure of clutch disc" refers to the surface pressure taking into account the surface area of the clutch disc including grooves formed in the surface of the clutch disc. The term "circumferential velocity at mean diameter of clutch disc" refers to the circumferential velocity at the mean diameter between the outside diameter and inside diameter of the clutch disc. The term "mean heat transfer coefficient" refers to the mean heat transfer coefficient from the clutch disc to the pressure oil.

(b) In the embodiment described above, the surface pressure of the clutch is found from the hydraulic pressures detected by the hydraulic pressure sensors 84, 85, but the surface pressure may also be found from the command signal sent from the controller 8 to the first clutch control valve 51 or the second clutch control valve 52. The surface pressure may also be found from the operation signal from the inching pedal 13.

(c) In the embodiment described above, a motor grader was given as an example of a work vehicle, but the present invention may also be applied to a bulldozer, a wheel loader, a forklift, and other work vehicles.

(d) In the embodiment described above, the inching operation is performed by the inching pedal 13, but a lever or another operation member may be used instead of a pedal as the inching operation member.

(e) In the embodiment described above, inching was performed by reducing the hydraulic pressure supplied to the FL clutch 63 or the FH clutch 64, but inching may also be performed by reducing the hydraulic pressure supplied to other clutches.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A work vehicle comprising:
   an engine;
   a hydraulic pump configured to be driven by the engine;
   a work implement configured to be driven by hydraulic pressure supplied by the hydraulic pump;
   a travel mechanism configured to cause the vehicle to travel;
   a clutch configured to selectively transmit drive force from the engine to the travel mechanism;
   an inching operation member disposed inside of an operator cab of the work vehicle and configured to be operated by an operator inside of the operator cab to create slippage in the clutch according to an operation amount of the inching operation member by the operator to reduce a vehicle speed while suppressing a reduction in a rotational speed of the engine and maintaining output of the work implement; and
   a controller configured to calculate load of the clutch during inching, and to reduce the rotational speed of the engine when the calculated load of the clutch during the inching exceeds a predetermined threshold.

2. The work vehicle according to claim 1, wherein the controller is configured to calculate the load of the clutch on the basis of a surface pressure of the clutch and a rate of slippage of the clutch.

3. The work vehicle according to claim 1, wherein the controller is configured to maintain the clutch in a slippage state while the controller reduces the rotational speed of the engine when the calculated load of the clutch during the inching exceeds a predetermined threshold.

4. The work vehicle according to claim 1, wherein
   the controller is configured to increase a fuel reduction amount according to an increase in the calculated load of the clutch in order to reduce the rotational speed of the engine.

5. A work vehicle comprising:
   an engine;
   a hydraulic pump configured to be driven by the engine;
   a work implement configured to be driven by hydraulic pressure supplied by the hydraulic pump;

a travel mechanism configured to cause the vehicle to travel;

a clutch configured to selectively transmit drive force from the engine to the travel mechanism;

an inching operation member disposed inside of an operator cab of the work vehicle and configured to be operated by an operator inside of the operator cab to create slippage in the clutch according to an operation amount of the inching operation member by the operator to reduce a vehicle speed while suppressing a reduction in a rotational speed of the engine and maintaining output of the work implement; and a controller configured to calculate temperature of the clutch during inching, and to reduce the rotational speed of the engine when the calculated temperature of the clutch during the inching exceeds a predetermined threshold.

6. The work vehicle according to claim 5, wherein the controller is configured to maintain the clutch in a slippage state while the controller reduces the rotational speed of the engine when the calculated temperature of the clutch during the inching exceeds a predetermined threshold.

7. The work vehicle according to claim 5, wherein the controller is configured to increase a fuel reduction amount according to an increase in the calculated temperature of the clutch in order to reduce the rotational speed of the engine.

* * * * *